United States Patent Office 3,404,195
Patented Oct. 1, 1968

3,404,195
PROCESS FOR IMPROVING THE THERMAL PROPERTIES OF HARDENED EPOXIDE RESINS
Erwin Weinrich, Dusseldorf-Holthausen, Germany, assignor to Henkel & Cie GmbH., Dusseldorf-Holthausen, Germany, a corporation of Germany
No Drawing. Filed Dec. 20, 1966, Ser. No. 603,100
Claims priority, application Germany, Apr. 6, 1966, H 59,035
6 Claims. (Cl. 260—830)

ABSTRACT OF THE DISCLOSURE

This invention relates to a novel process for improving the thermal properties of hardened epoxide resins without substantially effecting the mechanical properties which comprises reacting glycidylethers of polyhydric phenols with organic dicarboxylic acid anhydrides and up to 40% by weight of a crystallized triglycidyl isocyanurate while being molded.

Claim for priority

Under the provisions of 35 U.S.C. 119, the right of priority is claimed, based on the corresponding German priority application H 59,035, filed Apr. 6, 1966.

The prior art

It is known to improve the thermal properties of plastics, prepared from glycidyl ethers of polyhydric phenols, in that instead of using the customary organic dicarboxylic acid anhydrides as epoxide hardening compounds, polycarboxylic acid anhydrides, for example pyromellitic acid dianhydride, are used as a replacement in part or in all for the dicarboxylic acid anhydrides. However, for their utilization relatively high working temperatures have to be employed, which in turn allows only a short processing duration of the liquid resin-hardener mixture before setting. In addition, use of these polycarboxylic acid anhydrides causes a deterioration of the mechanical properties of the hardened epoxide resins produced.

Objects of the invention

An object of the invention is to present a process for the preparation of hardened epoxide resins by reacting glycidyl ethers of polyhydric phenols with dicarboxylic acid anhydrides in the presence of from about 5% to about 40% by weight of epoxide groups of a crystallized triglycidyl isocyanurate during the molding process. By means of this process the disadvantages previously described can be avoided, and hardened resins with good thermal characteristics are obtained without substantially effecting the mechanical properties.

A further object of the invention is to develop a process for increasing the thermal resistance of a hardened epoxide resin based on glycidyl ethers of polyhydric phenols without substantial effect on its flexibility which comprises the steps of reacting a mixture consisting of (1) glycidyl ethers of polyhydric phenols with (2) an organic dicarboxylic acid anhydride epoxide hardener, wherein at least 5% but less than 40% by weight of said glycidyl ethers is replaced by crystallized triglycidyl isocyanurate, under hardening conditions and recovering said hardened epoxide resin.

Another object of the invention is the production of a hardened epoxide resin based on glycidyl ethers of a polyhydric phenols having both flexibility and increased resistance to heat deformation.

These and other objects of the invention will become more apparent as the description thereof proceeds.

Description of the invention

These objects are attained according to the invention in that mixtures of glycidyl ethers of polyhydric phenols and triglycidyl isocyanurate, which contain at least 5%, but less than 40% of crystallized triglycidyl isocyanurate, are hardened by the use of organic dicarboxylic acid anhydride epoxide hardeners. An amount of at least 10% of the crystallized triglycidyl isocyanurate is preferred.

The crystallized triglycidyl isocyanurate to be used according to the process of the invention should have an epoxide oxygen content of at least 14%. The preparation of these crystallized triglycidyl isocyanurates is already known in the art, and described in copending, commonly-assigned U.S. patent application S.N. 292,725, filed July 3, 1963, now U.S. Patent No. 3,337,509. This preparation can be carried out by purifying crude reaction products, which are obtained, for example, by reacting cyanuric acid with an excess of epichlorohydrin. By single or repeated recrystallization from suitable solvents such as methanol, a crystallized triglycidyl isocyanurate with the required epoxide content can be prepared.

The process of the invention is suitable for the improvement of the thermal properties of hardened epoxide resins produced from glycidyl ethers of polyhydric phenols, in particular of glycidyl ethers of dihydric phenols. Of these, the glycidyl ethers of the diphenylol propane are preferred. The glycidyl ethers of the dihydric phenols have an epoxide equivalent of about 170 to 1200, preferably 180 to 450. In addition to the ones mentioned, also suitable are glycidyl ethers of chlorinated, brominated or methylated diphenylol propanes. Furthermore, for example the glycidyl ethers of hydroquinone or of resorcinol can be used, as well as mixtures of these glycidyl ethers. The epoxide equivalent of these resinous epoxide ethers should be between 170 and 1200.

The usual organic polyvalent dicarboxylic acid anhydrides used in the hardening of epoxide resinous compounds can be utilized as hardening agents. Preferably, however, are the organic dicarboxylic acid anhydrides such as, for example, the following: hexahydrophthalic acid anhydride, tetrahydrophthalic acid anhydride, phthalic acid anhydride, methylcyclohexanedicarboxylic acid anhydride, dodecenylsuccinic acid anhydride, endo-methylenetetrahydrophthalic acid anhydride, methylenomethylenetetrahydrophthalic acid anhydride, etc.

The amount of the organic polycarboxylic acid anhydride to be used shall be that customarily employed to harden epoxide resinous compounds. In particular the amount of the organic dicarboxylic acid anhydride should be chosen so that 0.6 to 1.2, preferably 0.8 to 0.9 of carboxylic acid anhydride groups are present in the hardenable mixture for each epoxide group.

The hardening of the reaction mixture is carried out under customary conditions at temperatures of 80° to 200° C., particularly 100° to 180° C., over a period of about 1 to 20 hours, preferably 2 to 8 hours. In most cases, the formation of the hardened epoxide resin is completed after this period of time. However, it is advisable, in order to assure that the hardening is complete, to temper the test specimens for an additional time at temperatures of about 180° to 210° C.

In some cases it is advisable to add accelerating agents to the reaction mixtures, such as 2,4,6-tri-(N,N-dimethylaminomethyl)-phenol.

As it is well known, dyes or fillers can be added to the mixtures of the invention, for example, quartz powder, glass powder, glass fibers, mica, aluminum oxide, titanium oxide, zirconium oxide, pulverized dolomite or barium sulfate.

In the molded bodies, obtained according to the process of the invention, the good mechanical properties of the hardened epoxide resins based on glycidyl ethers of polyhydric phenols are preserved. In addition to this, the hardened compounds of the invention exhibit improved thermal properties, in particular a good resistance to deformation due to heat, also a good thermal mass behavior. Moreover, the hardened products have improved electrical properties, which manifest themselves in the resistance to surface leakage of current, in the dielectrical loss factor, as well as in the dielectric constant. It was not to be anticipated, that in spite of the remarkable improvement of the thermal properties, the excellent mechanical characteristics would be preserved almost in their entirety.

The mixtures of the invention can be worked up into molded bodies in the usual manner by casting or pressure molding. Furthermore, they can be utilized as putty, adhesives or as coating materials. Consequently, the term "molding," as used in the preceding, can be interpreted in the most extensive sense.

The following specific embodiments are illustrative of the invention. It is to be understood, however, that they are not to be deemed limitative in any manner.

Example I

Mixtures were prepared consisting of a diglycidyl ether of diphenylol propane (epoxide equivalent, 186), hexahydrophthalic acid anhydride and of various amounts of triglycidyl isocyanurate (commercial mixture of the high- and low-melting form, epoxide oxygen content, 15.1%). The amount of hexahydrophthalic acid anhydride was measured in such manner, that 0.82 mol of the anhydride was allotted to 1 mol of epoxide oxygen contained in the mixture. Furthermore, 0.3% of 2,4,6-tri-(N,N-dimethylaminomethyl)-phenol, based on the total mixture, was added to the mixtures as accelerating agent. The processing time lasted 2 hours at a temperature of 120° C. In the usual manner, molded slabs measuring 10 x 15 x 120 mm. were prepared from these mixtures and hardened for 3 hours at a temperature of 160° C. Thereafter, these molded slabs were tempered for an additional period of 20 hours at 200° C. to attain the final properties.

In Table I, in the first column, the content of triglycidyl isocyanurate is given in percentage, based on the total amount of glycidyl ether. The following columns show the Martens temperature, the impact strength, the flexural strength and the deflection. The tests were conducted according to the following specifications: DIN 53 458; DIN 53 453; DIN 53 452.

TABLE I

| Triglycidyl Isocyanurate, percent | Martens, temp.,° C. | Impact strength, kg. cm./cm.² | Flexural strength, kg./cm.² | Deflection, mm. |
|---|---|---|---|---|
| 0 | 108 | 20 | 1,140 | 11 |
| 20 | 132 | 20 | 1,080 | 10 |
| 30 | 141 | 19.5 | 1,050 | 9–10 |
| 35 | 150 | 19.5 | 1,000 | 8–9 |

Example II

The process described in Example I was repeated, but in place of hexahydrophthalic acid anhydride, methylhexahydrophthalic acid anhydride was used. The values for the properties of the molded slabs thus obtained are presented in Table II. The processing time lasted 2 hours at a temperature of 120° C.

TABLE II

| Triglycidyl Isocyanurate, percent | Martens, temp.,° C. | Impact strength, kg. cm./cm.² | Flexural strength, kg./cm.² | Deflection, mm. |
|---|---|---|---|---|
| 0 | 110 | 20 | 1,100 | 11 |
| 20 | 140 | 20 | 1,010 | 10 |
| 30 | 154 | 19.5 | 960 | 9–10 |
| 35 | 165 | 19 | 905 | 9 |

Example III

Mixtures, consisting of a diglycidyl ether of diphenylol propane (epoxide equivalent, 398), hexahydrophthalic acid anhydride and of various amounts of triglycidyl isocyanurate (epoxide oxygen content, 15.1%) were prepared. The amount of hexahydrophthalic acid anhydride was measured so that 0.82 mol of anhydride were allotted to 1 mol of epoxide oxygen contained in the mixture. In the usual manner, test specimens were prepared and hardened according to the description given in Examples I and II.

The following Table III presents the values measured. The arrangement of this table corresponds with that in the preceding tables. Processing time, 2 hours at a temperature of 120° C.

TABLE III

| Triglycidyl Isocyanurate, percent | Martens, temp.,° C. | Impact strength, kg. cm./cm.² | Flexural strength, kg./cm.² | Deflection, mm. |
|---|---|---|---|---|
| 0 | 99 | 25 | 1,250 | 18 |
| 20 | 121 | 25 | 1,300 | 13 |
| 30 | 132 | 24 | 1,250 | 13 |
| 35 | 140 | 23 | 1,210 | 11 |

Example IV

Mixtures, consisting of a diglycidyl ether of diphenylol propane (epoxide equivalent, 398), methylhexahydrophthalic acid anhydride and of various amounts of triglycidyl isocyanurate (epoxide oxygen content, 15.1%), were prepared. The amount of carboxylic acid anhydride was measured so that 0.82 mol of methylhexahydrophthalic acid anhydride were allotted to 1 mol of epoxide oxygen contained in the mixture. In the usual manner, molding slabs were prepared from this mixture, hardened for 3 hours at 160° C. and then tempered for 20 hours at 200° C.

The following Table IV gives the measured values as a function of the addition of triglycidyl isocyanurate.

| Triglycidyl Isocyanurate, percent | Martens, temp.,° C. | Impact strength, kg. cm./cm.² | Flexural strength, kg./cm.² | Deflection, mm. |
|---|---|---|---|---|
| 0 | 97 | 25 | 1,200 | 12 |
| 20 | 114 | 22 | 1,150 | 11 |
| 30 | 126 | 21 | 1,130 | 11 |
| 35 | 138 | 19 | 1,100 | 10 |

Comparison test 32 gm. of pyromellitic acid dianhydride (20% of the anhydride groups) were added to a mixture consisting of 203 gm. of a glycidyl ether of diphenylol propane (epoxide equivalent, 186) and of 128 gm. of hexahydrophthalic acid anhydride (80% of the anhydride groups). This mixture was melted at a temperature of 170° C. and molded slabs were cast therefrom. The hardening was conducted for 3 hours at 160° C. Thereafter, the molded slabs were tempered for 20 hours at 200° C.

The molded bodies obtained had the following values:

Martens temperature _____° C__ 120
Impact strength _____kg. cm./cm.²__ 15
Flexural strength _____kg./cm.²__ 870

This test was repeated, but instead of the previous epoxide hardener mixture, a mixture consisting of 96 gm. of hexahydrophthalic acid anhydride (60% of the anhydride groups) and 64 gm. of pyromellitic acid dianhydride (40% of the anhydride groups) were used.

The test specimens showed the following values:

Martens temperature _____° C__ 132
Impact strength _____kg. cm./cm.²__ 12
Flexural strength _____kg./cm.²__ 715

The mixtures described in the preceding had to be melted at temperatures between 160° and 170° C. After cooling to 120° C., only 15 minutes of working-up time were available.

It was not possible to prepare molded bodies from a mixture consisting of a glycidyl ether of diphenylol propane with an epoxide equivalent of 398 and 40% of pyromellitic acid dianhydride and 60% of hexahydrophthalic acid anhydride. The hardening rate was at the required high temperatures so fast, that within the usual working-up time the viscosity increased too greatly for practical purposes.

The preceding specific embodiments are presented as an illustration of the invention. It is to be understood, however, that other expedients known to those skilled in the art can be employed without departing from the spirit of the invention or the scope of the appended claims.

I claim:
1. A process for increasing the thermal resistance of a hardened epoxide resin based on glycidyl ethers of polyhydric phenols without substantial effect on its flexibility which comprises the steps of reacting a mixture consisting of (1) glycidyl ethers of polyhydric phenols with (2) an organic dicarboxylic acid anhydride epoxide hardener, wherein at least 5% but less than 40% by weight of said glycidyl ethers is replaced by crystallized triglycidyl isocyanurate, under hardening conditions and recovering said hardened epoxide resin.

2. The process of claim 1 wherein at least 10% but less than 35% by weight of said glycidyl ethers of polyhydric phenols is replaced by crystallized triglycidyl isocyanurate.

3. The process of claim 1 wherein said crystallized triglycidyl isocyanurate has an epoxide oxygen content of at least 14%.

4. The process of claim 1 wherein said glycidyl ethers of a polyhydric phenol is a glycidyl ether of diphenylol propane having an epoxide equivalent of between about 170 and about 1200.

5. The process of claim 4 wherein said glycidyl ether of diphenylol propane has an epoxide equivalent of between 180 and 450.

6. A hardened epoxide resin based on glycidyl ethers of polyhydric phenols having both flexibility and increased resistance to heat deformation produced by the process of claim 1.

References Cited
UNITED STATES PATENTS 3,337,509   8/1967   Budnowski _____ 260—37

WILLIAM H. SHORT, *Primary Examiner.*

T. D. KERWIN, *Assistant Examiner.*